US010886992B2

(12) United States Patent
Ng

(10) Patent No.: US 10,886,992 B2
(45) Date of Patent: *Jan. 5, 2021

(54) CHANNEL QUALITY INDICATOR METHOD, ASSOCIATED BASE STATION, AND ASSOCIATED USER EQUIPMENT

(75) Inventor: Boon Loong Ng, Victoria (AU)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,172

(22) Filed: Jul. 6, 2012

(65) Prior Publication Data

US 2012/0269066 A1 Oct. 25, 2012

Related U.S. Application Data

(62) Division of application No. 13/257,462, filed as application No. PCT/JP2010/055144 on Mar. 17, 2010, now Pat. No. 9,077,503.

(30) Foreign Application Priority Data

Mar. 19, 2009 (AU) ................................ 2009901196

(51) Int. Cl.
*H04W 24/10* (2009.01)
*H04B 7/06* (2006.01)
(Continued)

(52) U.S. Cl.
CPC ........... *H04B 7/0632* (2013.01); *H04B 7/024* (2013.01); *H04B 7/0413* (2013.01);
(Continued)

(58) Field of Classification Search
CPC ... H04L 5/0023; H04L 1/0026; H04L 1/0028; H04L 27/2601; H04L 27/2607;
(Continued)

(56) References Cited

U.S. PATENT DOCUMENTS 8,149,749 B2 * 4/2012 Maeda et al. ................. 370/311
8,379,507 B2 * 2/2013 Bertrand et al. .............. 370/203
(Continued)

FOREIGN PATENT DOCUMENTS

CN 101369843 2/2009
WO WO 2007/145035 * 12/2007 ............... H04B 7/26

OTHER PUBLICATIONS

ZTE, "Discussion of CQI-RS design for LTE-A CoMP", R1-090632, Feb. 13, 2009.*
(Continued)

*Primary Examiner* — Luat Phung
*Assistant Examiner* — Zhaohui Yang
(74) *Attorney, Agent, or Firm* — Kunzler Bean & Adamson

(57) ABSTRACT

It would be to provide a method which will work with future versions of LTE-A, be backwards compatible and alleviate interference to signals for basic system operation.
The method includes generating one or more Reference Signals associated with the one or more Channel Quality Indicators, and includes mapping the one or more Channel Quality Indicator-Reference Signals to the last symbol of the second slot of the one or more subframes.

17 Claims, 9 Drawing Sheets

(51) Int. Cl.

| | |
|---|---|
| *H04L 1/00* | (2006.01) |
| *H04L 5/00* | (2006.01) |
| *H04J 3/16* | (2006.01) |
| *H04L 5/14* | (2006.01) |
| *H04B 7/024* | (2017.01) |
| *H04B 7/0413* | (2017.01) |
| *H04L 27/26* | (2006.01) |
| *H04W 72/04* | (2009.01) |
| *H04W 74/08* | (2009.01) |
| *H04W 16/14* | (2009.01) |

(52) U.S. Cl.
CPC .......... *H04B 7/0639* (2013.01); *H04J 3/1694* (2013.01); *H04L 1/0026* (2013.01); *H04L 1/0028* (2013.01); *H04L 5/0035* (2013.01); *H04L 5/0048* (2013.01); *H04L 5/0051* (2013.01); *H04L 5/0057* (2013.01); *H04L 5/14* (2013.01); *H04L 27/2601* (2013.01); *H04L 27/2607* (2013.01); *H04W 24/10* (2013.01); *H04W 72/0446* (2013.01); *H04W 74/085* (2013.01); *H04L 5/0016* (2013.01); *H04L 5/0053* (2013.01); *H04W 16/14* (2013.01)

(58) Field of Classification Search
CPC ... H04L 5/0016; H04L 5/0035; H04L 5/0048; H04L 5/0051; H04L 5/0053; H04L 5/0057; H04L 5/14; H04W 24/10; H04W 72/0446; H04W 16/14; H04W 74/085; H04B 7/024; H04B 7/0413; H04B 7/0632; H04B 7/0639; H04J 3/1694
USPC .................. 370/311, 235, 203, 329; 455/450
See application file for complete search history.

(56) References Cited

U.S. PATENT DOCUMENTS

| | | | | |
|---|---|---|---|---|
| 2006/0009227 | A1* | 1/2006 | Cudak et al. ................ | 455/450 |
| 2008/0139237 | A1* | 6/2008 | Papasakellariou ........... | 455/522 |
| 2009/0046570 | A1 | 2/2009 | Sarkar et al. | |
| 2009/0067391 | A1* | 3/2009 | Shen et al. .................... | 370/336 |
| 2009/0154588 | A1 | 6/2009 | Chen et al. | |
| 2009/0238256 | A1* | 9/2009 | Onggosanusi ........ | H04L 5/0007 375/228 |
| 2010/0046412 | A1 | 2/2010 | Varadarajan et al. | |
| 2010/0091893 | A1* | 4/2010 | Gorokhov .................... | 375/260 |
| 2010/0118989 | A1* | 5/2010 | Sayana et al. ................ | 375/260 |
| 2010/0195566 | A1 | 8/2010 | Krishnamurthy et al. | |
| 2010/0322100 | A1* | 12/2010 | Wan et al. .................... | 370/252 |
| 2011/0159901 | A1 | 6/2011 | Frenger et al. | |
| 2011/0237270 | A1* | 9/2011 | Noh et al. .................... | 455/450 |
| 2011/0293037 | A1* | 12/2011 | Liu et al. ...................... | 375/295 |

OTHER PUBLICATIONS

Ad Hoc chairman, "Way forward on CoMP and MIMO DL RS" R1-090529, 3GPP TSG RAN1 #55b, Ljubljana, Slovenia, Jan. 12-16, 2009.*
Extended European Search Report dated Dec. 21, 2012 in corresponding European Application No. 12182932.9.
Qualcomm Europe: "Impact of Downlink CoMP on the Air Interface", 3GPP Draft; R1-090366, 3rd Generation Partnership Project (3GPP), Mobile Competence Centre; 650, Route Des Lucioles; F-06921 Sophia-Antipolis Cedex; France, No. Ljubljana; Jan. 8, 2009, Jan. 8, 2009 (Jan. 8, 2009), XP050318270.
Korean Official Action—10-2011-7024554—dated Aug. 10, 2012.
Huawei, "DL Coordinated Beam Switching for Interference management in LTE-Advanced," 3GPP TSG RAN WG1#54bis, R1-083710 (Sep. 29-Oct. 3, 2008.
International Search Report PCT/JP2010/05514 dated Apr. 27, 2010.
3GPP TSG-RAN WG1 #56, R1-091066, Feb. 9-13, 2009.
3GPP TSG-RAN WG1 Meeting #56bis, R1-091221, Mar. 23-27, 2009.
3GPP TS 36.213 V8.5.0 (Dec. 2008), 3rd Generation Partnership Project; Technical Specification Group Radio Access Network; Evolved Universal Terrestrial Radio Access (E-UTRA); Physical layer procedures (Release 8).
3GPP TS 36.211 V8.5.0 (Dec. 2008), 3rd Generation Partnership Project; Technical Specification Group Radio Access Network; Evolved Universal Terrestrial Radio Access (E-UTRA); Physical Channels and Modulation (Release 8).
3GPP TSG-RAN Working Group 1 Meeting #56, ZTE, R1-090632, Feb. 9-13, 2009.
3GPP TSG-RAN1 #54, Motorola, R1-083224, Aug. 18-22, 2008.
PTO-892 dated Jun. 2013; U.S. Appl. No. 13/257,462.
CN Office Action dated Jul. 31, 2013 with English translation; Application No. 201080012550.5.
U.S. Office Action dated Nov. 21, 2013; U.S. Appl. No. 13/590,695.
NTT DoCoMo, DL RS Design for LTE-Advanced, 3GPP TSG RAN WG1 Meeting #56bis R1-091483, pp. 1-7, Mar. 23-27, 2009.
Nokia, Nokia Siemens Networks, CSI-RS design for LTE-Advanced downlink, 3GPP TSG RAN WG1 Meeting #56-bis R1-091351, pp. 1-8, Mar. 23-27, 2009.
Samsung, DL RS Designs for Higher Order MIMO, 3GPP TSG RAN WG1 #56 R1-090619, pp. 1-7, Feb. 9-13, 2009.
TD Tech, Dedicated RS design w/wo overhead reduction, 3GPP TSG RAN WG1#52bis R1-081338, pp. 1-3, Mar. 4, 2008.
Japanese Official Action—2013-208237—dated May 27, 2014.
Chinese Office Action, dated Oct. 11, 2014, in corresponding Chinese Patent Application No. 201080012550.5.
3GPP TSG RAN WG1 Meeting#49bis R1-072930;CATT;Downlink Dedicated Reference Symbols Structure for TDD with Frame Structure Type 2; Body Section 1, Figure 2.

* cited by examiner

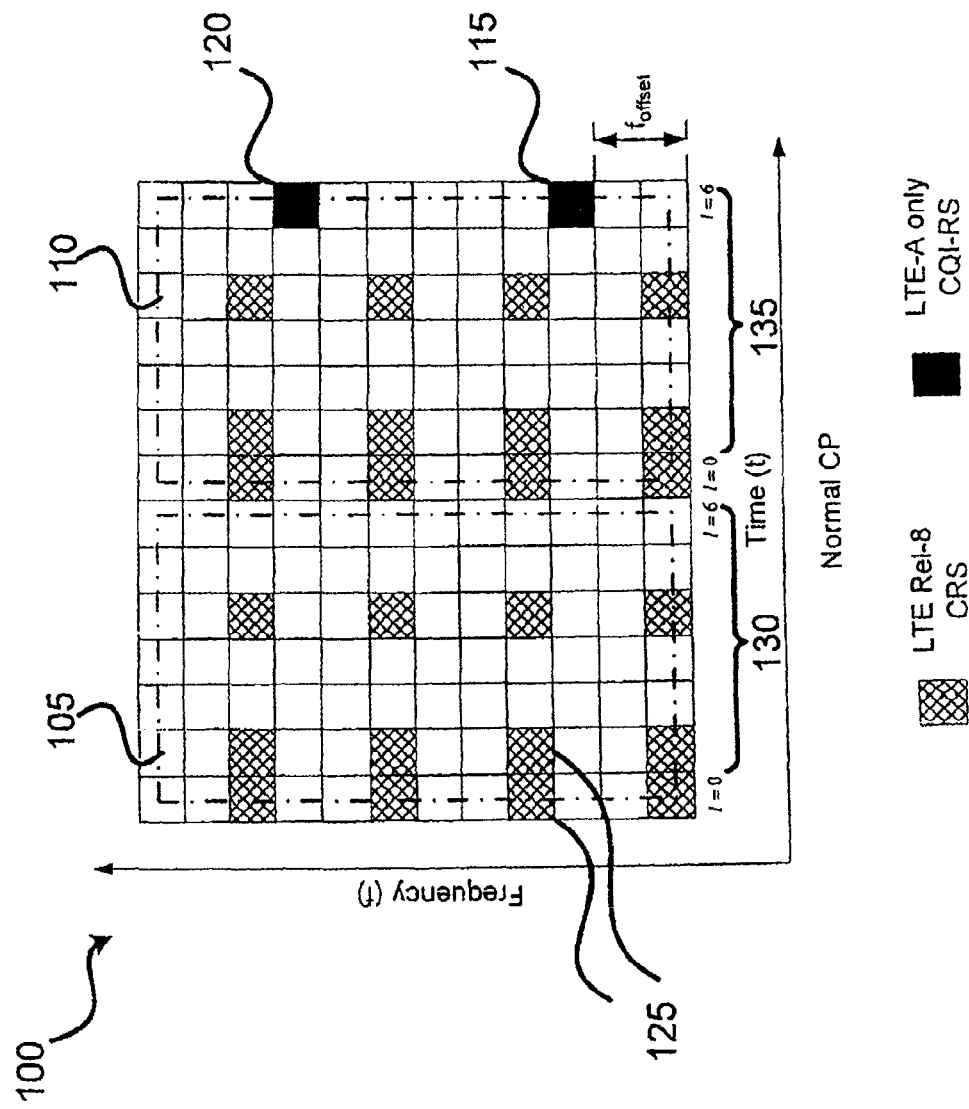

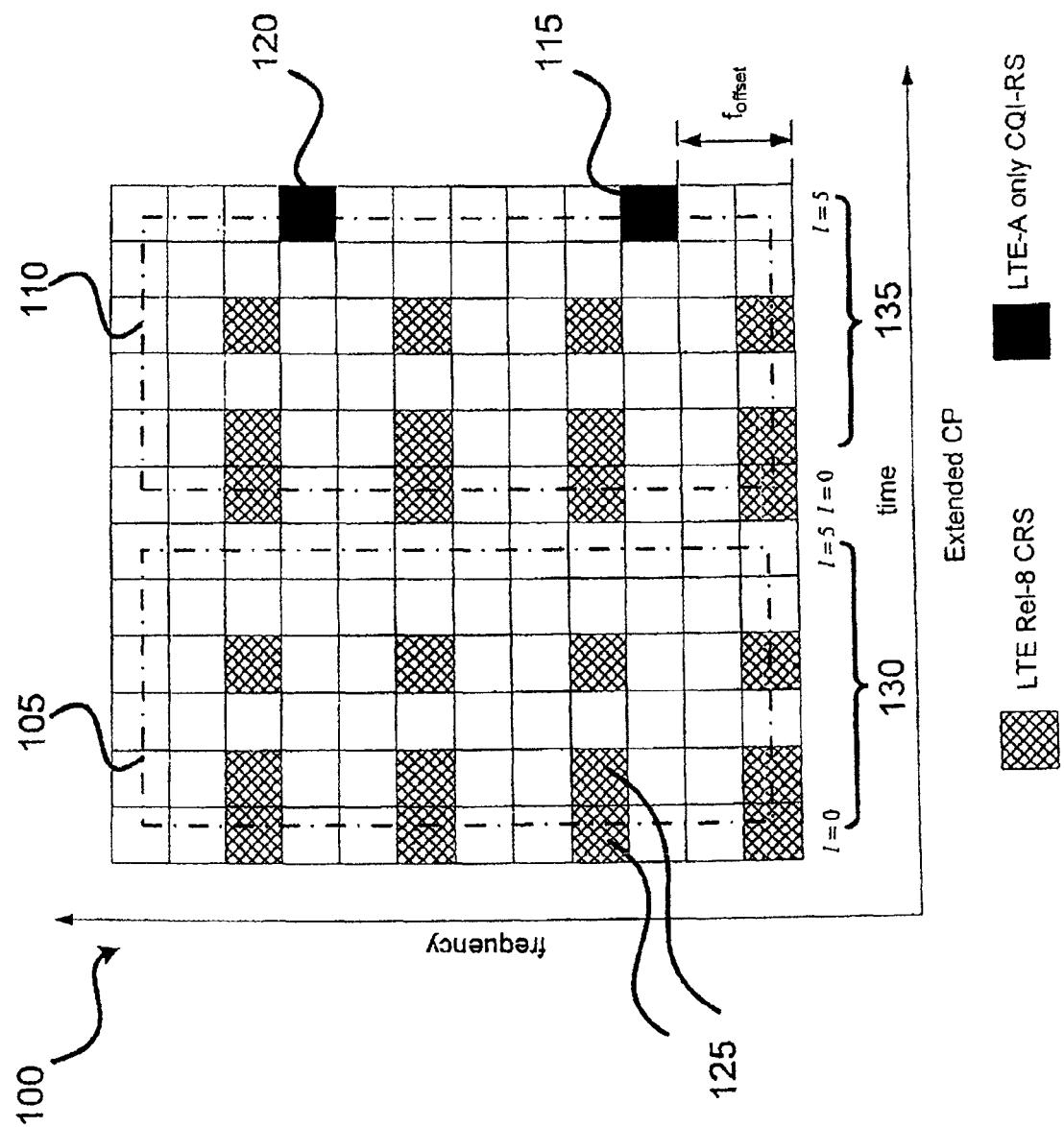

CHANNEL QUALITY INDICATOR METHOD, ASSOCIATED BASE STATION, AND ASSOCIATED USER EQUIPMENT

CROSS REFERENCE TO RELATED APPLICATIONS

This application is a division of co-pending application Ser. No. 13/257,462 filed on Sep. 19, 2011, which is a National Stage of PCT/JP2010/055144 filed on Mar. 17, 2010, which claims foreign priority to Australian Application No. 2009901196 filed on Mar. 19, 2009. The entire content of each of these applications is hereby expressly incorporated by reference.

TECHNICAL FIELD

The present invention relates to wireless communications systems, and more particularly to a method for determining and transmitting Channel Quality Indicator Reference Signals (CQI-RS) from one or more subframes such that an associated User Equipment (UE) can use the CQI-RS to measure CQI.

BACKGROUND ART

In advanced mobile communication systems, such as the Long-Term-Evolution (LTE) system and the Long-Term-Evolution Advanced (LTE-A) system, User Equipment (UE) is utilised to measure and to report a number of parameters in the communication system including Rank Indicator (RI), Channel Quality Indicator (CQI) or Precoding Matrix Indicator (PMI) to the evolved Node B (eNB) thereby enabling support of resource allocation, link adaptation and spatial multiplexing transmission.

Currently, LTE (Release-8) RI, CQI/PMI measurement is performed based on the cell-specific reference signals (CRS). Each CRS is associated with transmit antenna ports at the eNB (there is a maximum of 4 transmit antenna ports). Therefore, the maximum number of transmission layers that can be supported for spatial multiplexing is limited by the number of antenna ports available (i.e. 4).

It is envisaged that for LTE-A (Release-10), the number of antenna ports used for spatial multiplexing or the number of transmission layers should be up to 8. Therefore, more Reference Signals are needed to enable the support of higher-order MIMO transmission.

Further, a new technology under consideration for LTE-A is Coordinated Multi-Point (CoMP) transmission. The LTE-A UE may therefore also be required to measure and report the RI, CQI/PMI (or similar metric) for the Reference Signal transmitted from the eNBs that participate in CoMP transmission.

A problem with this increase in complexity is the possibility of interference to signals important for basic system operation together with backward compatibility issues on older UEs.

It would therefore be desirable to provide a method which will work with future versions of LTE-A, be backwards compatible and alleviate interference to signals for basic system operation.

It will be appreciated that a reference herein to any matter which is given as prior art is not to be taken as an admission that that matter was, in Australia or elsewhere, known or that the information it contains was part of the common general knowledge as at the priority date of the claims forming part of this specification.

DISCLOSURE OF THE INVENTION

A improved channel quality indicator method for determining and transmitting one or more Channel Quality Indicator Reference Signals from one or more subframes such that an associated User Equipment can use the Channel Quality Indicator Reference Signals to measure Channel Quality Indicator, the subframes including first and second slots, each of the first and second slots including a plurality of symbols, and each of the first and second slots forming a resource block, wherein the method comprising:
  generating one or more Reference Signals associated with the one or more Channel Quality Indicators;
  mapping the one or more Channel Quality Indicator-Reference Signals to the last symbol of the second slot of the one or more subframes.

The following description refers in more detail to the various features and steps of the present invention. To facilitate an understanding of the invention, reference is made in the description to the accompanying drawings where the invention is illustrated in a preferred embodiment. It is to be understood however that the invention is not limited to the preferred embodiment illustrated in the drawings.

BRIEF DESCRIPTION OF THE DRAWINGS

FIG. 1A is a schematic diagram of a subframe having two normal Cyclic Prefix (CP) resource blocks illustrating the location of the CQI-RS for one layer;

FIG. 1B is a schematic diagram of a subframe having two extended Cyclic Prefix (CP) resource blocks illustrating the location of the CQI-RS for one layer;

CARRYING OUT THE INVENTION

Figure 2:
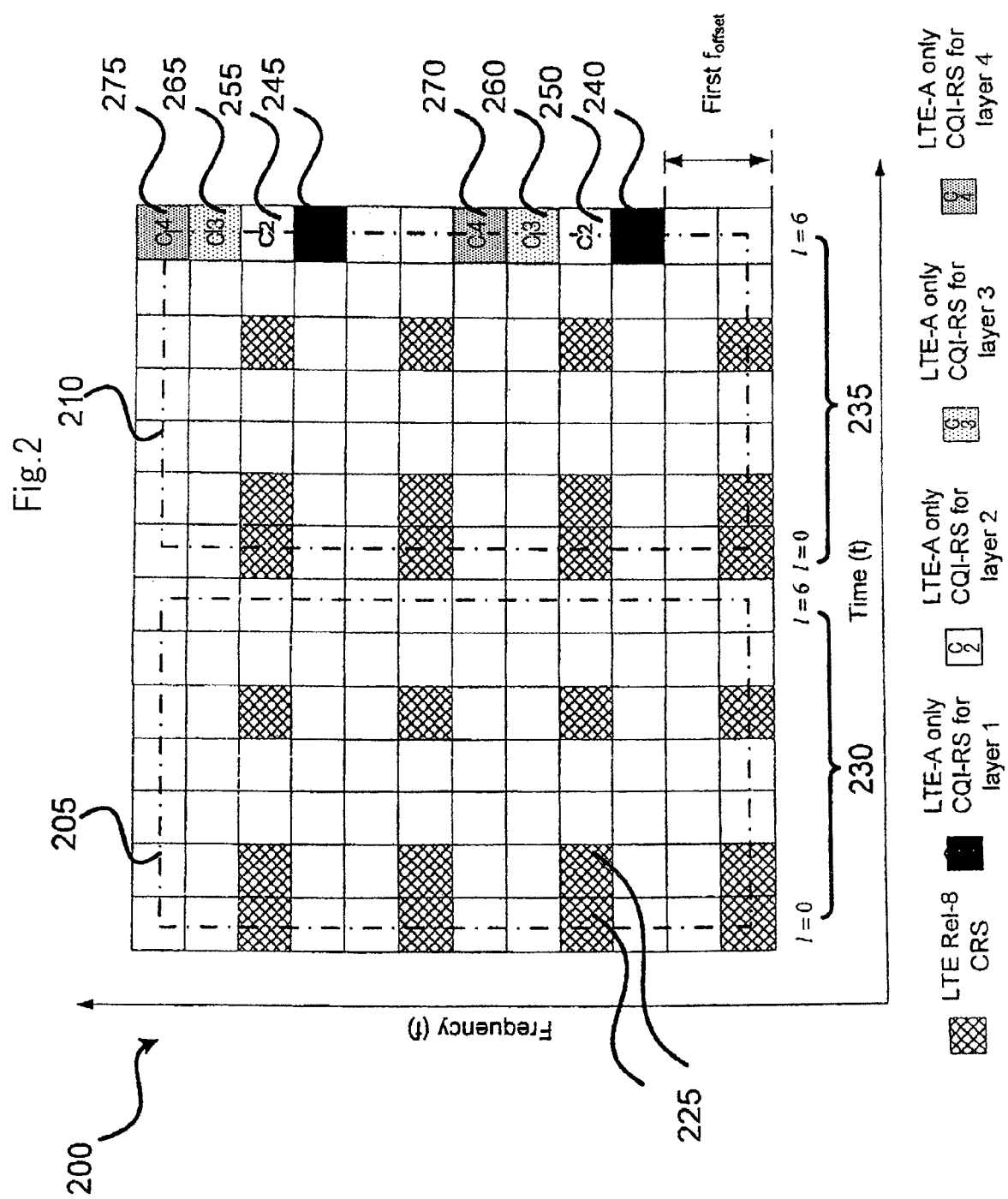
FIG. 2 is a schematic diagram of a subframe having two normal Cyclic Prefix (CP) resource blocks illustrating the location of the CQI-RS for multiple layers for multiplexing via (Frequency Division Multiplexing) FDM.

Exemplary embodiments of the present invention are next described in detail with reference to the accompanying figures Referring now to FIG. 1A, there is shown a subframe 100 having two normal Cyclic Prefix (CP) resource blocks 105, 110. The subframe 100 is shown with a frequency (f) axis and a time (t) axis. The resource blocks 105, 110 are transmission units which are one slot 130, 135 wide in time (t) and twelve subcarriers wide in frequency (f). Included in each of the slots 130, 135 are seven symbols along the time axis for a normal Cyclic Prefix resource block 105, 110. A number of resource elements which make up the overall resource block 105, 110 are cell-specific reference signals (CRS) 125 and first and second "Long Term Evolution—Advanced Channel Quality Indicator-Reference Signal" (LTE-A CQI-RS) 115, 120.

In operation, the CQI-RS of a layer is transmitted in last OFDM symbol (i.e. OFDM symbol number 6 in the second slot 135), in order to avoid collision with Rel-8 cell-specific reference signals (CRS), Rel-8 Dedicated Reference Signal (DRS), and Physical Broadcast CHannel (PBCH) and synchronisation signals. Preferably, there are two CQI-RS REs within a resource block 105, 110 and the CQI-RSs are uniformly distributed over the 12 subcarriers of the resource block. Providing two CQI-RS REs for each layer is advantageous since it has been found to provide a good balance between CQI-RS overhead and CQI measurement performance.

Also shown in FIG. 1A, is a first cell-specific subcarrier offset $f_{offset}$ for higher-layer configurations. First $f_{offset}$ determines the Resource Element (RE) location offset of the CQI-RS from the lowest subcarrier index in a resource block. This is shown in FIG. 1A for First $f_{offset}$=2. In the preferred case of two CQI-RS REs per resource block, First $f_{offset}$ can take value from 0-5.

FIG. 1B is identical to FIG. 1A but illustrates a subframe 100 which includes two extended Cyclic Prefix (CP) resource blocks 105, 110. The subframe 100 is shown with a frequency (f) axis and a time (t) axis. The resource blocks 105, 110 are transmission units which are one slot 130, 135 wide in time (t) and twelve subcarriers wide in frequency (f). Each of the slots 130, 135 are six symbols along the time axis for an extended Cyclic Prefix resource block 105, 110. In operation, the CQI-RS of a layer is transmitted in last OFDM symbol (i.e. OFDM symbol number 5 in the second slot 135).

Advantageously, by designing CQI-RS for all layers applicable to LTE-A operation to be placed in only one particular OFDM symbol within a subframe provides a simple way to avoid interference to/from Rel-8 CRS, Rel-8 DRS, and PBCH and synchronisation signals.

FIG. 2 is shows a subframe 200 having two normal Cyclic Prefix (CP) resource blocks 205, 210 and further shows the preferred location of the CQI-RS for multiple layers for multiplexing via Frequency Division Multiplexing. Like FIGS. 1A and 1B, the subframe 200 is shown with a frequency (f) axis and a time (t) axis. The resource blocks 205, 210 are transmission units which are one slot 230, 235 wide in time (t) and twelve subcarriers wide in frequency (f). Each of the slots 230, 235 include seven symbols along the time axis for a normal Cyclic Prefix resource block 205, 210. A number of resource elements make up the resource block 205, 210 including cell-specific reference signals (CRS) 225 together with first LTE-A CQI-RS 240 (layer 1), second LTE-A CQI-RS 245 (layer 1), first LTE-A CQI-RS 250 (layer 2), second LTE-A CQI-RS 255 (for layer 2), first LTE-A CQI-RS 260 (layer 3), second LTE-A CQI-RS 265 (layer 3), first LTE-A CQI-RS 270 (layer 4) and second LTE-A CQI-RS 275 (layer 4).

In FIG. 2, CQI-RS of all layers for LTE-A operation are transmitted in the same OFDM symbol (i.e. symbol number 6) for the case that the layers are multiplexed via FDM. The particular arrangement within the FDM framework is illustrative, other arrangements are possible.

Figure 3:
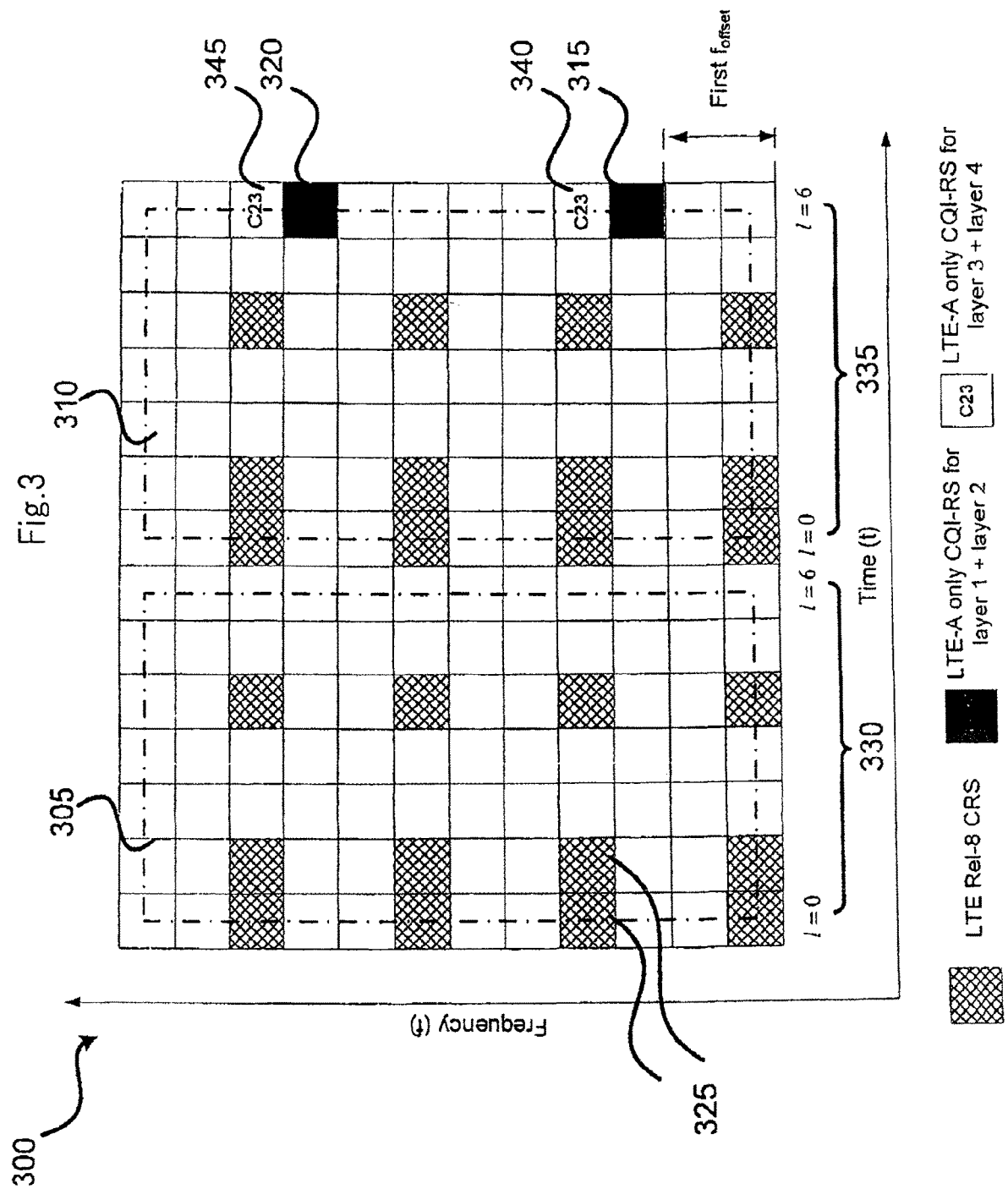
FIG. 3 is a schematic diagram of a subframe having two normal Cyclic Prefix (CP) resource blocks illustrating the location of the CQI-RS for multiple layers for multiplexing via hybrid FDM and (Code Division Multiplexing) CDM.

FIG. 3 shows a subframe 300 having two normal Cyclic Prefix (CP) resource blocks 305, 310 and further shows the preferred location of the CQI-RS for multiple layers for multiplexing via hybrid Frequency Division Multiplexing (FDM) and Code Division Multiplexing (CDM). A number of resource elements make up the resource block 305, 310 including cell-specific reference signals (CRS) 325 together with first LTE-A CQI-RS 315 (layer 1 and layer 2), second LTE-A CQI-RS 320 (layer 1 and layer 2), first LTE-A CQI-RS 340 (layer 3 and layer 4) and second LTE-A CQI-RS 345 (layer 3 and layer 4).

In FIG. 3, CQI-RS of all layers for LTE-A operation are transmitted in the same OFDM symbol (i.e. symbol number 6) for the case that the layers are multiplexed hybrid via FDM and CDM. The particular arrangement within the hybrid FDM and CDM framework is illustrative, other arrangements are possible.

Figure 4:
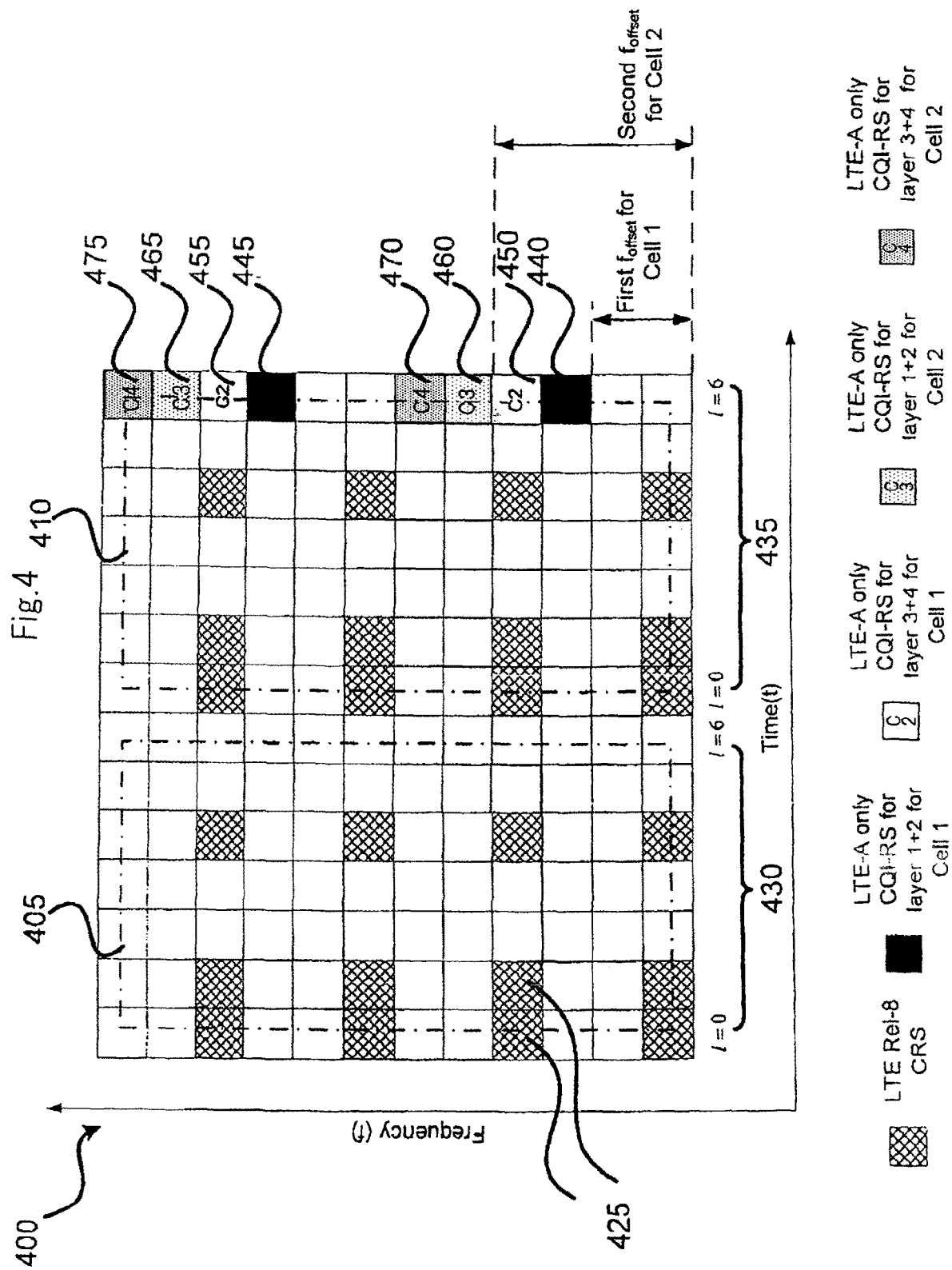
FIG. 4 is a schematic diagram of a subframe having two normal Cyclic Prefix (CP) resource blocks illustrating the location of the CQI-RS for multiple layers for CoMP cells multiplexed via hybrid FDM and CDM.

FIG. 4 shows a subframe 400 having two normal Cyclic Prefix (CP) resource blocks 405, 410 illustrating the location of the CQI-RS for multiple layers for CoMP cells multiplexed via hybrid FDM and CDM. In operation, the CQI-RS of a layer is transmitted in last OFDM symbol (i.e. OFDM symbol number 6 in the second slot 435), in order to mitigate CQI-RS intercell interference. The intercell interference is further reduced by including a first cell-specific subcarrier offset First $f_{offset}$ and a second cell-specific subcarrier offset Second $f_{offset}$. First $f_{offset}$ determines the Resource Element (RE) location offset of the CQI-RS from the lowest subcarrier index of a resource block for Cell-1. This is shown in FIG. 4 for First $f_{offset}$=2. Second $f_{offset}$ determines the Resource Element (RE) location offset of the CQI-RS from the lowest subcarrier index of a resource block for Cell-2. This is shown in FIG. 4 for Second $f_{offset}$=4. Therefore, LTE-A CQI-RS are as follows: first LTE-A CQI-RS 440 (layer 1 and 2 for cell 1), second LTE-A CQI-RS 445 (layer 1 and 2 for cell 1), first LTE-A CQI-RS 450 (layer 3 and 4 for cell 1), second LTE-A CQI-RS 455 (layer 3 and 4 for cell 1), first LTE-A CQI-RS 460 (layer 1 and 2 for cell 2), second LTE-A CQI-RS 465 (layer 1 and 2 for cell 2), first LTE-A CQI-RS 470 (layer 3 and 4 for cell 2) and second LTE-A CQI-RS 475 (layer 3 and 4 for cell 2).

Advantageously, $f_{offset}$ allows for robust intercell interference management for CoMP CQI-RS transmission.

Transmission Period Configuration of LTE-A Only CQI-RS

Figure 5:
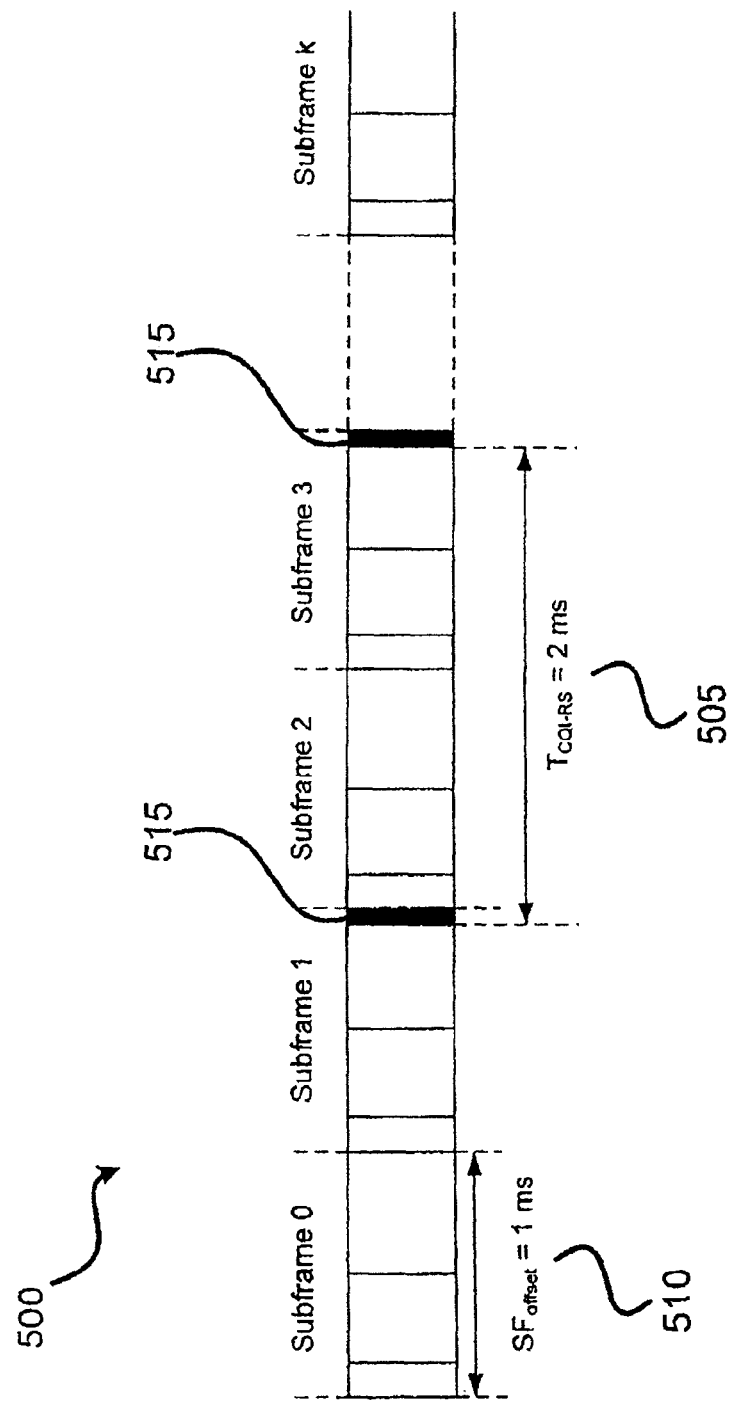
FIG. 5 is a schematic diagram of a series of subframes illustrating use of a cell-specific subframe offset.

FIG. 5 is a schematic diagram of a series of subframes 500 illustrating use of a cell-specific subframe offset SFoffset 510 and the CQI-RS transmission period, $T_{CQI-RS}$ 505. $T_{CQI-RS}$ 505 is the same as the CQI/PMI reporting period for LTE Rel-8, i.e. 2 ms, 5 ms, 10 ms, 20 ms, 40 ms, 80 ms and 160 ms for Frequency Division Duplex (FDD), and 1 ms, 5 ms, 10 ms, 20 ms, 40 ms, 80 ms and 160 ms for Time Division Duplex (TDD). However, $T_{CQI-RS}$ 505 is cell-specific while the CQI/PMI reporting period is UE-specific, hence the configuration of $T_{CQI-RS}$ 505 and CQI/PMI reporting period are independent. In practice, the CQI/PMI reporting period is generally not shorter than $T_{CQI-RS}$ 505.

Higher-layer configured cell-specific subframe offset SFoffset 510 determines the subframe offset for CQI-RS transmission relative to subframe 0 within a frame. SFoffset takes the value from 0 ms to (TCQI-RS-1) ms. FIG. 5 shows a $T_{CQI-RS}$ 505 of 2 ms and SFoffset of 1 ms. The final resource block of subframes 1 and 3 are shown as element 515.

Figure 6:
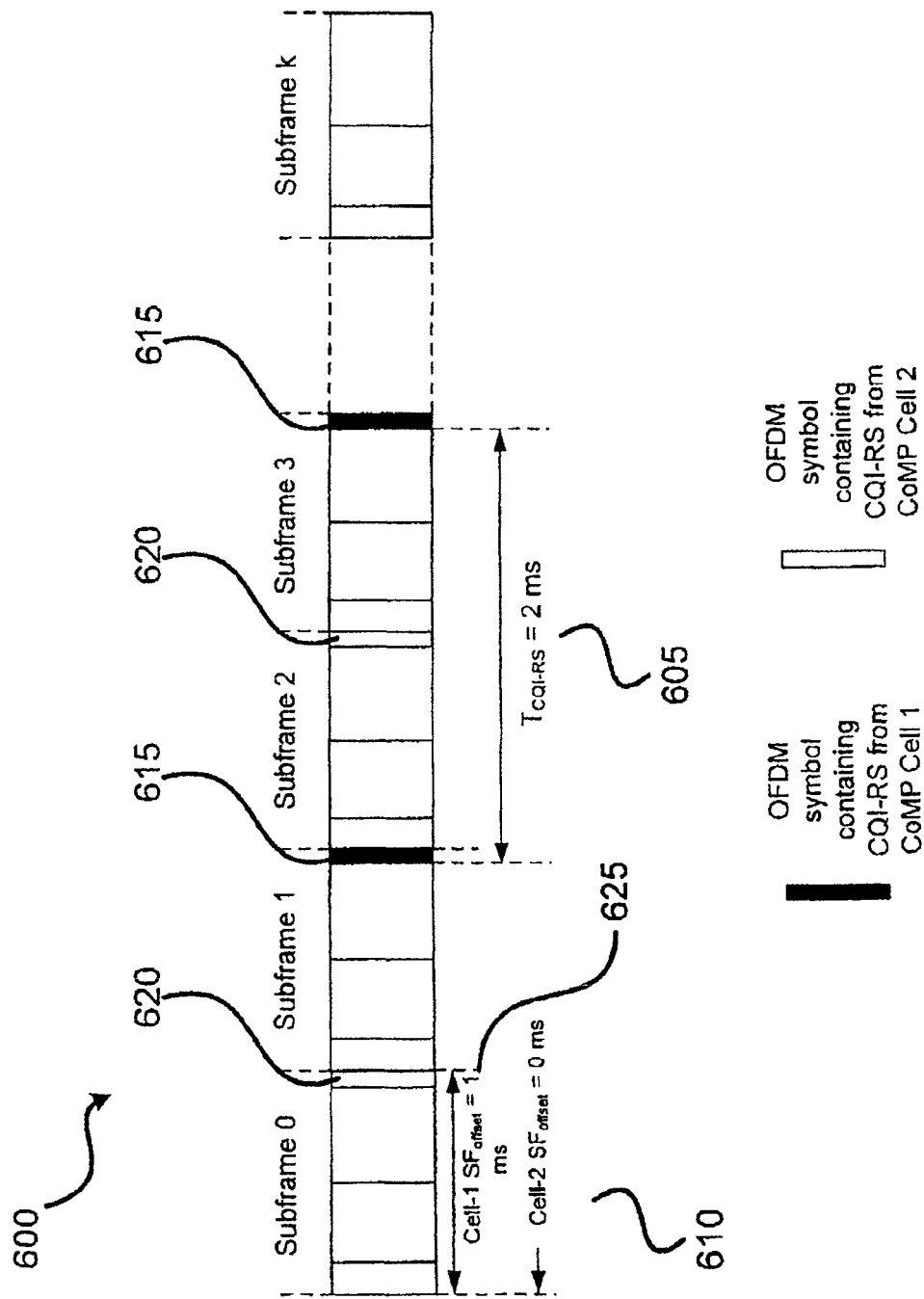
FIG. 6 is a schematic diagram of a series of subframes illustrating use of a cell-specific subframe offset designed for CoMP cells.

Advantageously, $T_{CQI-RS}$ 505 is useful in controlling the CQI-RS overhead whereas SFoffset 510 is useful for mitigating CQI-RS intercell interference among CoMP cells. FIG. 6 shows a series of subframes 600 and illustrates an example of how SFoffset can be used to avoid CQI-RS of different CoMP cells being transmitted in the same subframe. In this case Cell-1 SFoffset 625 has a value of 1 ms and Cell-2 SFoffset 610 has a value of 0 ms and a $T_{CQI-RS}$.605 of 2 ms. The final resource block of subframes 0 and 2 are shown as element 620; and the final resource block of subframes 1 and 3 are shown as element 615.

Resource Block Allocation for LTE-A Only CQI-RS

The CQI-RS subband which may be denoted k is defined in the similar way as the CQI-reporting subband for LTE Rel-8. The CQI-RS subband size or equivalently the total number of resource blocks that contain CQI-RS is determined based on the system bandwidth for a single component carrier, similar to the CQI-reporting subband size determination for LTE Rel-8. Specifically, the CQI-RS subband size is determined as shown in Table 1.

TABLE 1

CQI-RS Subband Size k vs. System Bandwidth of a single component carrier

| System Bandwidth of a single component carrier | CQI-RS Subband Size, k |
| --- | --- |
| 6-7 | Entire system bandwidth |
| 8-10 | 4 |
| 11-26 | 4 |
| 27-63 | 6 |
| 64-110 | 8 |

Figure 7:
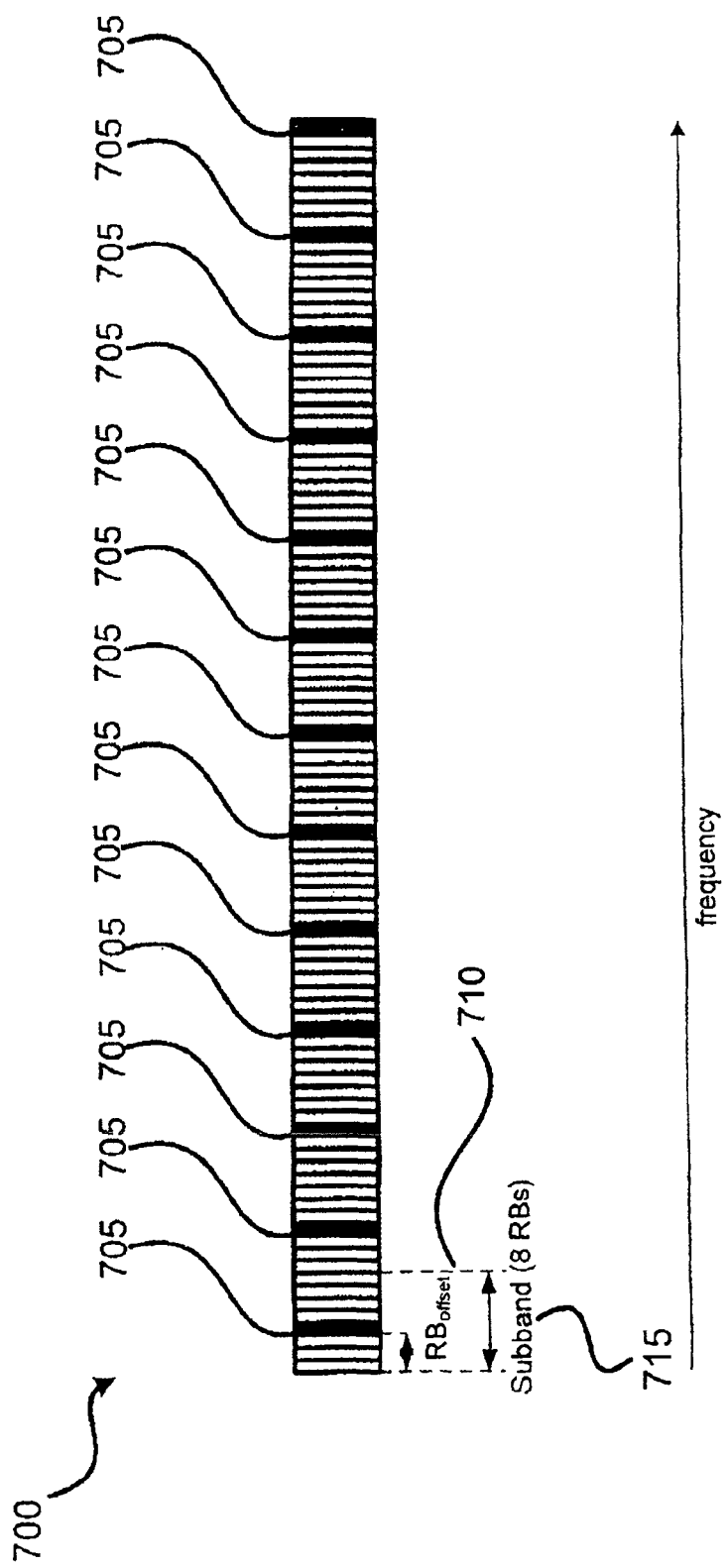
FIG. 7 is a schematic diagram of bandwidth of subframes illustrating the use of the resource block offset parameter $RB_{offset}$.

There is only one resource block in a CQI-RS subband that contains CQI-RS. With this in mind, FIG. 7 shows a schematic diagram of bandwidth (20 Mhz) of subframes 700 (having eight resource blocks in each subband 715) illustrating the use of the resource block offset parameter $RB_{offset}$ 710. Each subband 715 includes a resource block 705 which contains CQI-RS (the subband size=8 resource blocks). The exact location of the resource block that contains CQI-RS is determined by the parameter RBoffset 710. RBoffset ranges from 0 to k-1.

RBoffset 710 can be either configured by a higher-layer or can cycle from the first resource block to the last resource block within the subband as subframe number increments (i.e. round-robin allocation of the CQI-RS to the resource blocks within the subband).

Figure 8:
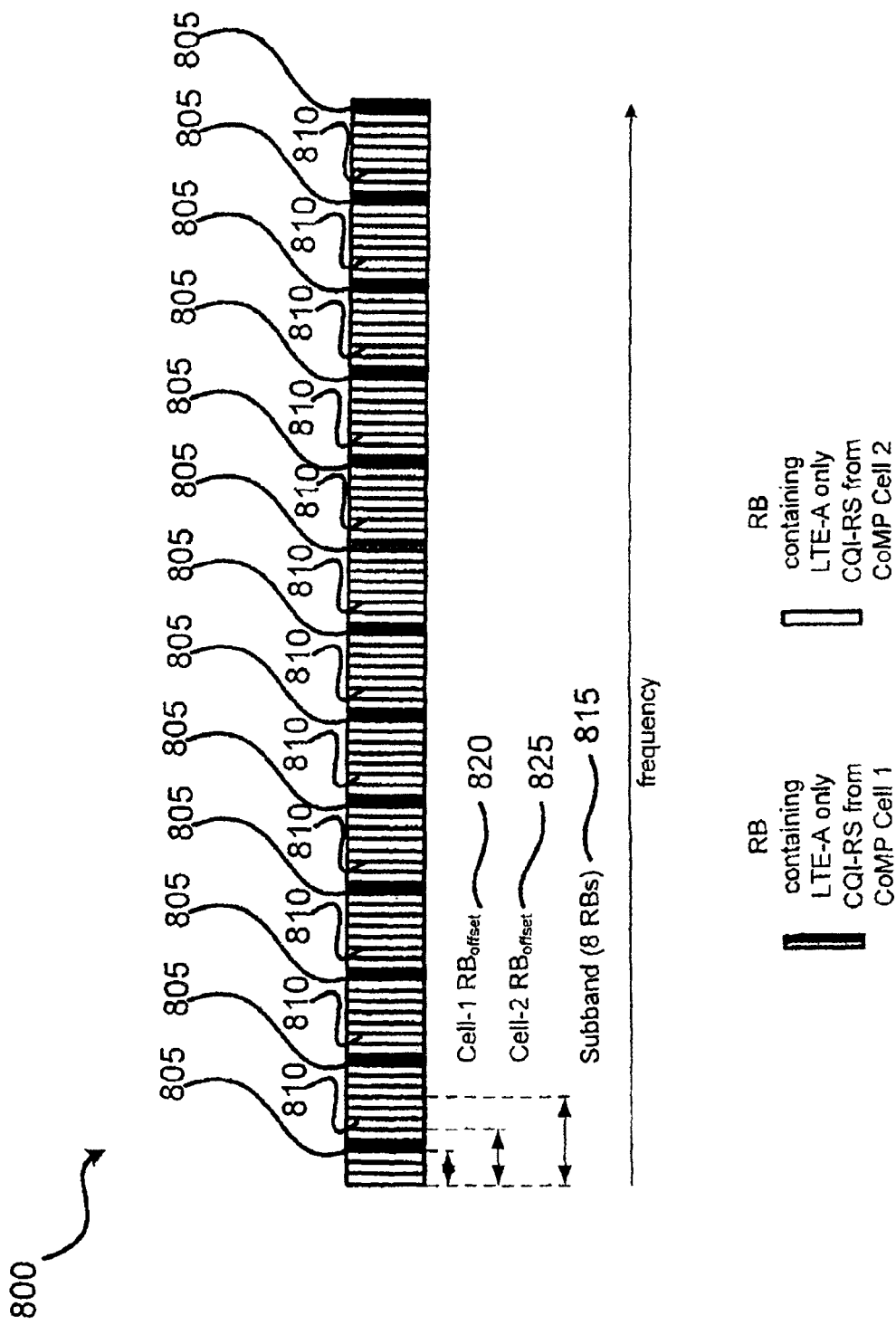
FIG. 8 is a schematic diagram of bandwidth of subframes illustrating the use of the resource block offset parameter $RB_{offset}$ suitable for CoMP cells.

Advantageously, the parameter RBoffset can also be used to mitigate CQI-RS intercell interference among CoMP cells as shown in FIG. 8. In FIG. 8 there shown a Cell-1 RBoffset 820 and a Cell-2 RBoffset 825 within a subband 815. The two offsets are used to avoid CQI-RS of different CoMP cells being transmitted in the same resource block. In case of the round-robin assignment, collision can be avoided by configuring different starting position for different CoMP cell for the round-robin operation.

Advantageously, there is only one resource block in a CQI-RS subband that contains CQI-RS. The total number of resource blocks that contain CQI-RS is determined based on the system bandwidth for a single component carrier. Advantageously, the resource blocks containing CQI-RS are uniformly distributed over the system bandwidth which means it is able to cover the entire system bandwidth (within a component carrier). This is known as the "wideband" requirement in LTE-A. In a further advantage, the arrangement minimises the impact on legacy User Equipment (e.g. LTE Rel-8) by minimising the number of resource blocks that contains CQI-RS within a subband.

Although the exemplary embodiments of the invention have been disclosed for illustrative purposes, those skilled in the art will appreciate that various modifications, additions and substitutions are possible without departing from the scope of the present invention. Therefore, the present invention is not limited to the above-described embodiments but is defined by the following claims.

This application is based upon and claims the benefit of priority from Australian provisional patent application No. 2009901196 filed on Mar. 19, 2009 the disclosure of which is incorporated herein in its entirety by reference.

The invention claimed is:

1. A method implemented in a base station used in a wireless communications system, comprising:
    transmitting to a user equipment (UE) two channel quality indicator (CQI) reference signals using two resource elements per transmission layer of a plurality of transmission layers within a subframe comprising a resource block, wherein each transmission layer of the plurality of transmission layers is multiplexed using frequency division multiplexing; and
    receiving from the user equipment a report determined according to said two CQI reference signals;
    wherein a value of a subframe offset corresponding to the subframe is within a range from 0 ms to $(T_{CQI-RS}-1)$ ms, where $T_{CQI-RS}$ denotes a CQI reference signal transmission period, and the report comprises a rank indicator, a channel quality indicator, and a precoding matrix indicator, wherein:
    the subframe comprises the resource block and a last orthogonal frequency division multiplexing symbol in the resource block conveys at least one of the two CQI reference signals;
    the CQI reference signal transmission period is cell-specific and a CQI reporting period or a PMI reporting period is user equipment-specific;
    the two channel quality indicator reference signals are repeated at a period of 5 subframes, 10 subframes, 20 subframes, 40 subframes, or 80 subframes; and
    the CQI reference signal transmission period is 1 ms, 5 ms, 10 ms, 20 ms, 40 ms, or 80 ms.

2. The method according to claim 1, wherein the CQI reporting period or the PMI reporting period is equal to or longer than the CQI reference signal transmission period.

3. The method according to claim 1, wherein the value of the subframe offset is greater than 0 ms and up to $(T_{CQI-RS}-1)$ ms, where $T_{CQI-RS}$ denotes a CQI reference signal transmission period.

4. The method according to claim 1, wherein the subframe offset is cell-specific.

5. The method according to claim 1, wherein said two CQI reference signal resource elements are used for one or more antenna ports for spatial multiplexing, the number of said one or more antenna ports being equal to or less than 8, or for one or more transmission layers, the number of said one or more transmission layers being equal to or less than 8.

6. The method according to claim 1, wherein a CQI reference signal position depends on a cyclic prefix (CP) length.

7. The method according to claim 1, wherein the base station is configured to be used in a Coordinated Multi-Point (CoMP) transmission.

8. The method according to claim 1, wherein the value of the subframe offset is greater than 0 ms and up to $(T_{CQI-RS}-1)$ ms, where $T_{CQI-RS}$ denotes the CQI reference signal transmission period, and the value of the subframe offset is taken to avoid channel quality indicator (CQI) reference signals being transmitted in the same subframe.

9. A base station used in a wireless communications system, comprising:
a transmitter to transmit to a user equipment (UE) two channel quality indicator (CQI) reference signals using two resource elements per transmission layer of a plurality of transmission layers within a subframe comprising a resource block, wherein each transmission layer of the plurality of transmission layers is multiplexed using frequency division multiplexing, and the CQI reference signal transmission is transmitted from the base station at a CQI reference signal transmission period; and
a receiver to receive from the user equipment a report determined according to the two CQI reference signals;
wherein a value of a subframe offset is within a range from 0 ms to ($T_{CQI-RS}$-1) ms, where $T_{CQI-RS}$ denotes a CQI reference signal transmission period, and the report comprises a rank indicator, a channel quality indicator, and a precoding matrix indicator, wherein:
the subframe comprises the resource block and a last orthogonal frequency division multiplexing symbol in the resource block conveys at least one of the two CQI reference signals;
the CQI reference signal transmission period is cell-specific and a CQI reporting period or a PMI reporting period is user equipment-specific;
the two channel quality indicator reference signals are repeated at a period of 5 subframes, 10 subframes, 20 subframes, 40 subframes, or 80 subframes; and
the CQI reference signal transmission period is 1 ms, 5 ms, 10 ms, 20 ms, 40 ms, or 80 ms.

10. A method implemented in a user equipment (UE) used in a wireless communications system, comprising:
receiving from a base station two channel quality indicator (CQI) reference signals using two resource elements per transmission layer of a plurality of transmission layers within a subframe comprising a resource block, wherein each transmission layer of the plurality of transmission layers is multiplexed using frequency division multiplexing; and
transmitting to the base station a report determined according to said two CQI reference signals;
wherein the value of the subframe offset is within a range from 0 ms to ($T_{CQI-RS}$-1) ms, where $T_{CQI-RS}$ denotes a CQI reference signal transmission period, and the report comprises a rank indicator, a channel quality indicator, and a precoding matrix indicator, wherein:
the subframe comprises the resource block and a last orthogonal frequency division multiplexing symbol in the resource block conveys at least one of the two CQI reference signals;
the CQI reference signal transmission period is cell-specific and a CQI reporting period or a PMI reporting period is user equipment-specific;
the two channel quality indicator reference signals are repeated at a period of 5 subframes, 10 subframes, 20 subframes, 40 subframes, or 80 subframes; and
the CQI reference signal transmission period is 1 ms, 5 ms, 10 ms, 20 ms, 40 ms, or 80 ms.

11. The method according to claim 10, wherein the CQI reporting period or the PMI reporting period is equal to or longer than the CQI reference signal transmission period.

12. The method according to claim 10, wherein the value of the subframe offset is greater than 0 ms and up to ($T_{CQI-RS}$-1) ms, where $T_{CQI-RS}$ denotes the CQI reference signal transmission period.

13. The method according to claim 10, wherein the subframe offset is cell-specific.

14. The method according to claim 10, wherein said two CQI reference signal resource elements are used for one or more antenna ports for spatial multiplexing, the number of said one or more antenna ports being equal to or less than 8, or for one or more transmission layers, the number of said one or more transmission layers being equal to or less than 8.

15. The method according to claim 10, wherein a CQI reference signal position depends on a cyclic prefix (CP) length.

16. The method according to claim 10, wherein the base station is configured to be used in a Coordinated Multi-Point (CoMP) transmission.

17. A user equipment (UE) used in a wireless communications system, comprising:
a receiver to receive from a base station two channel quality indicator (CQI) reference signals using two resource elements per transmission layer of a plurality of transmission layers within a subframe comprising a resource block, wherein each transmission layer of the plurality of transmission layers is multiplexed using frequency division multiplexing, and the CQI reference signal transmission is transmitted from the base station at a CQI reference signal transmission period; and
a transmitter to transmit to the base station a report determined according to the two CQI reference signal resource elements;
wherein the value of the subframe offset is within a range from 0 ms to ($T_{CQI-RS}$-1) ms, where $T_{CQI-RS}$ denotes a CQI reference signal transmission period, and the report comprises a rank indicator, a channel quality indicator, and a precoding matrix indicator, wherein:
the subframe comprises the resource block and a last orthogonal frequency division multiplexing symbol in the resource block conveys at least one of the two CQI reference signals;
the CQI reference signal transmission period is cell-specific and a CQI reporting period or a PMI reporting period is user equipment-specific;
the two channel quality indicator reference signals are repeated at a period of 5 subframes, 10 subframes, 20 subframes, 40 subframes, or 80 subframes; and
the CQI reference signal transmission period is 1 ms, 5 ms, 10 ms, 20 ms, 40 ms, or 80 ms.

* * * * *